United States Patent [19]

Casper et al.

[11] 4,165,360

[45] Aug. 21, 1979

[54] MULTI-PHASE FLOW TUBE FOR MIXING, REACTING AND EVAPORATING COMPONENTS

[75] Inventors: Clemens Casper, Krefeld; Axel Lippert, Krefeld-Verberg; Johannes O. Sajben, Krefeld, all of Fed. Rep. of Germany

[73] Assignee: Bayer Aktiengesellschaft, Leverkusen, Fed. Rep. of Germany

[21] Appl. No.: 829,367

[22] Filed: Aug. 31, 1977

[30] Foreign Application Priority Data

May 4, 1977 [DE] Fed. Rep. of Germany ....... 2719956

[51] Int. Cl.² .......................... B01F 5/20; B01D 1/22; B01J 10/00; F28D 7/02
[52] U.S. Cl. .................................. 422/202; 159/6 R; 159/26 A; 165/156; 202/185 D; 202/185 E; 366/167; 366/341; 422/207; 422/138
[58] Field of Search ..................... 23/292 R, 290, 260; 259/4 R, 4 A, 4 AB, 4 AC; 159/49, 6 R, 26 A, 26 R; 202/185 D, 185 E; 165/139, 154, 156; 526/64; 422/202, 224

[56] References Cited

U.S. PATENT DOCUMENTS

| 2,259,180 | 10/1941 | Schoenfeld et al. .................. 526/64 |
|---|---|---|
| 2,440,623 | 4/1948 | Voorhees ......................... 259/4 R X |
| 2,737,479 | 3/1956 | Nicholson ..................... 23/252 R X |
| 2,971,969 | 2/1961 | Lobo ............................... 23/252 R X |
| 3,254,965 | 6/1966 | Ogle .................................... 23/290 X |
| 3,834,441 | 9/1974 | Vernaleken et al. ............ 159/6 R X |

Primary Examiner—Michael S. Marcus
Attorney, Agent, or Firm—Gene Harsh; Joseph C. Gil

[57] ABSTRACT

An apparatus for mixing, reacting and/or evaporating components in a multi-phase flow tube, comprising a helically wound tube having an inlet pipe in the closed tube periphery and a separation vessel at the end of the tube. The coiled tube is surrounded by a tempering jacket divided into sections.

3 Claims, 5 Drawing Figures

MULTI-PHASE FLOW TUBE FOR MIXING, REACTING AND EVAPORATING COMPONENTS

BACKGROUND OF THE INVENTION

In process engineering, compounds are frequently separated or mixed. At the same time, reactions may occur. Particular difficulties are presented by compounds which, in order to obtain a satisfactory quality, may only be treated in a narrow temperature range under certain pressure conditions. The treatment is particularly critical in the case of high viscosity compounds because the residual component becomes increasingly more difficult to evaporate with falling vapor pressure. In many cases, undesirable, barely separable compound concentrations occur even when components are mixed in. This may give rise to reductions in the quality of the product, particularly in the case of exothermic reactions.

There are a whole number of types of apparatus which are used for mixing, evaporating and for reactions.

A screw evaporator is known in which one or more heatable screws in a housing provide for the transport and, optionally, mixing of the liquid mixture, the component to be evaporated off optionally being run off in vacuo from the empty overlying space. The high viscosity liquid layer and the small evaporation surface complicate evaporation. The construction is complicated and unreliable in operation on account of the presence of rotating parts. The installation and operating costs are high.

In thin-layer evaporation, a liquid film from which one of the components evaporates is produced by mechanically rotating wiper elements on the heated wall of an elongated, cylindrical container. Evaporation of the residual component decreases continuously with falling vapor pressure unless a vacuum is applied. However, vacuum increases the danger of undesirable foaming. The rotating elements increase unreliability in operation. The investment and operating costs are high.

In falling-film evaporators, there are several parallel vertical tubes along whose inner wall liquid flows down in a thin layer. Gas flows through in the free inner space in the same or opposite direction. Because of the limited tube length, the residence time is often not long enough for residual evaporation. A certain quantity has to flow through in order to prevent local overheating by temporary breakage of the film which may lead to destruction of the heat-sensitive material. In addition, it is only possible to use liquids of low viscosity in which case the undesirable entrainment of liquid droplet cannot always be avoided.

In tubular coil evaporators a polymer solution (U.S. Pat. No. 3,834,441) is heated under excess pressure and is expanded through a nozzle into a helically wound tube. A liquid film is driven along the wall by the internally flowing gas stream to form a secondary stream. One disadvantage of this apparatus is that it is not possible to influence or modify an operation once it has started. There is no flexibility in the mode of operation of the apparatus. The specific output decreases towards the tube exit. When vacuum is applied, the output limit is rapidly reached by the critical mass flow density which determines when the film breaks. The apparatus may only be used for evaporating a particular component.

Accordingly, an object of the present invention is to provide an apparatus which, under a predetermined pressure and at a temperature which is controlled in sections over a wide working range, and allows either for intensive mixing by the measured addition of compounds to a liquid, optionally with simultaneous control of a certain reaction sequence, and/or for a thermal separation of one or more compounds, optionally with recovery of individual fractions. The substances must be carefully treated, even in the case of viscous liquids, with high selectivity in a static apparatus.

DESCRIPTION OF THE INVENTION

According to the present invention, this object is achieved with an apparatus for mixing, reacting and/or evaporating components in a multi-phase flow tube, comprising a helically wound tube having a feed pipe in the closed entrance of the tube and a separation vessel at the end of the tube, the coiled tube being surrounded by a tempering jacket divided into sections, and one or more closed conduits projecting from the side into the interior of the tube are arranged along the axis of the coiled tube.

The advantages afforded by the present invention are the fact that the intensive process of a multi-phase flow tube may be influenced from outside by built-in conduits. Thus, it is possible to introduce identical or different compounds at certain points of the coiled tube in such a way that the mixture is able largely to homogenize again before any new addition is made. In this way, harmful concentrations of substances are avoided. The measured addition is particularly important in the case of exothermic or endothermic reactions where product damage can occur if the occasionally very narrow temperature range is exceeded.

The partial pressure may also be kept low by the addition of gas, particularly inert gas, so that evaporation remains substantially constant over the entire length of the tube.

On the other hand, it is also possible to remove components. Evaporation is facilitated by the drawing off of vapors. The flow rate is reduced so that the film of liquid does not break up on the wall.

In addition, it is possible to draw off gas or liquid in fractions, the process being assisted by the heating medium in the tempering jacket divided into sections.

The apparatus is extremely flexible to use. In addition, it is possible to cover all working parameter ranges by the position of the conduits and by the length of the coiled tube.

Despite the careful treatment of the products, the specific output is high.

The apparatus is compact, simple in structure and easy to maintain. Due to the absence of rotating parts, it is reliable in operation. The investment and operating costs are low.

In one particular embodiment, the feed pipe is in the form of a two-component nozzle.

In addition to the steam required for driving the liquid ring along the coiled tube by the expansion of a heated liquid after the feed pipe, it is also possible to use a two-component nozzle in which inert gas, in particular, is added as the second component. The advantage of this is that, despite the lower vapor pressure of the component to be evaporated, it avoids the need for vacuum which would involve the danger of foaming.

In another embodiment, the openings of the conduits in the coiled tube are in the form of nozzles.

Depending upon their arrangement and configuration, the nozzles enable the component to be added to be so finely dispersed that intensive mixing is obtained.

In another embodiment, the openings of the conduits in the coiled tube are in the form of vents.

Depending upon the configuration of the vents and the position of their openings relative to the axis of the coiled tube, it is possible either to draw off the vapors flowing inside the tube or to strip off part of the liquid ring at the edge. In this connection, it is important that the disruption of the liquid film should be minimized by stream-lining the fittings.

In one particular embodiment, each conduit is connected to a metering device.

Through one or more metering devices, the individual conduits may be charged with certain quantities of the components to be added in such a way that the mixing or reaction process takes place in stages according to the pre-set program. The evaporation process may also be improved by adding gas or externally generated steam to lower the partial pressure of the component to be evaporated to such an extent that there is no need for an expensive vacuum to be applied.

In one useful embodiment, each conduit is connected to an evacuation system.

The selective separation of the phases in the multiphase flow tube enables one phase to be drawn off without anything of the other phases being entrained. In this way, it is possible to draw off part of the medium and, hence, to reduce the flow rate before the critical mass flow density is reached. At such time, the liquid film is broken up by the internally flowing gaseous medium and, hence, leads to product damage by overheating. This is of particular advantage with very high vacuums ($\leq 10$ Torr) or with large evaporation volumes.

In one embodiment, the tube diameter of the coiled tube decreases towards the tube exit.

By tapering the tube, the wetting surface is made smaller so that, even with a high vapor component, the film is prevented from breaking up and causing product damage by the resultant overheating of the wall surfaces.

DESCRIPTION OF THE PREFERRED EMBODIMENTS

Some embodiments of the present invention are illustrated as follows with reference to the accompanying drawings.

FIG. 1 is a section through a two-phase flow tube.
FIG. 2 is a section through a nozzle.
FIG. 3 is a section through a pipe-shaped outlet conduit.
FIG. 4 is a section through a slotted intake conduit.
FIG. 5 is a section through a stripper.

FIG. 1 shows a coiled tube, 1, with lateral conduits, 2, including valves, 3, and a tempering jacket, 4. At the closed beginning, 5, of the coiled tube, 1, there is a feed pipe, 6, which, in this case, is in the form of a two-component nozzle, 7. The coiled tube, 1, terminates at its end, 8, in the separation vessel, 9, which has a vapor outlet, 10, and a liquid outlet, 11.

Figure 1:
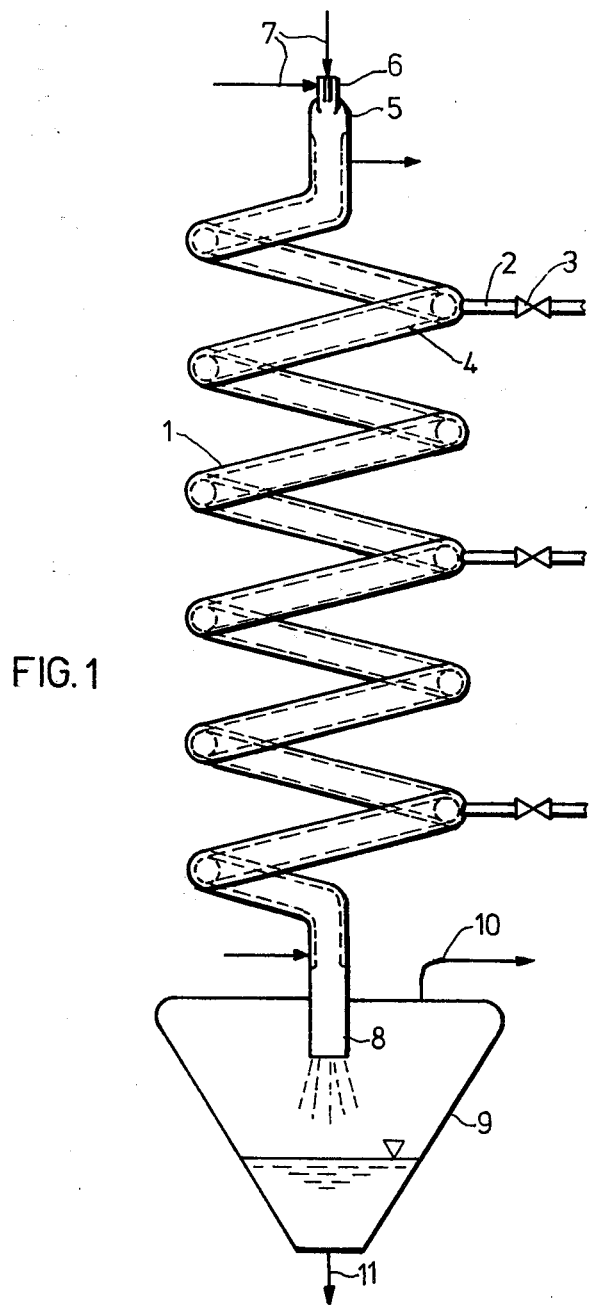
Figure 2:
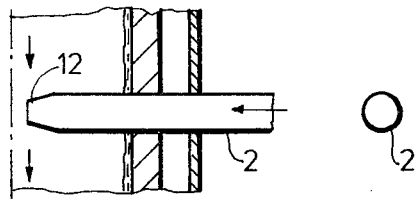
FIG. 2 shows an inlet nozzle, 12, at the end of the conduit, 2, which uniformly disperses one or more substance components in the gas stream.
Figure 3:
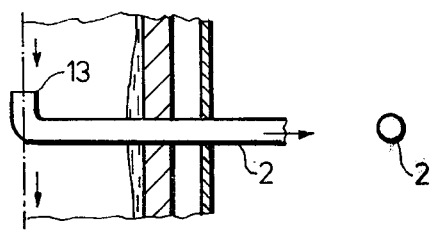
FIG. 3 shows a pipe-shaped vent, 13, at the end of the conduit, 2. By virtue of its shaping, the vent prevents liquid from flowing along the conduit to its opening where entrainment during removal of the vapor might result.
Figure 4:
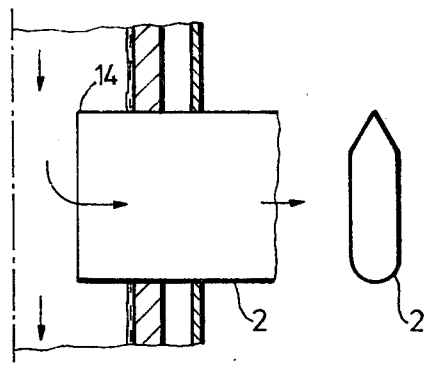

In FIG. 4, a conduit, 2, is in the form of an aerodynamically rounded slotted conduit, 14, which is particularly suitable for venting in high vacuums.

Figure 5:
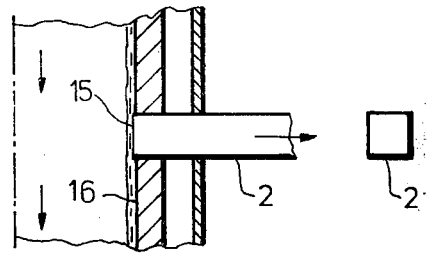

FIG. 5 shows an encircling ring-like vent, 15, connected to the conduit, 2, for directly running off liquid at the wall, 16.

EXAMPLE 1

For evaporation a multiphase tube (length 9 m, $\phi$ 15 mm) with an always coiled shape (tube diameter/coil diameter 0.05) was used, which has on the top a nozzle ($\phi$ 2 mm) and in spaces of 0.5 m and 3 m one at time conduits with a cross section of 4 mm². A bulk polymer containing from 4.5 to 5%, by weight, of monomer is sprayed in a quantity of 10 kg/h, together with 4.5 m³/h of nitrogen by a supply pressure of 5 bar into the inner tube through a two-component nozzle at a temperature of 200° C. and under a pressure of 0.7 atms gauge and charged with nitrogen in a quantity of 5.5 m³/h through the lateral nozzles of the conduits.

A 100% pure polymer was obtained at the tube exit, showing that all the monomers had been eliminated.

EXAMPLE 2

The mixing and reacting process runs in a multiphase tube (length 6 m, $\phi$ 50 mm) with an coiled shape (tube diameter/coil 0.1), wherein the nozzle at the top has a diameter ($\phi$ 8 mm) by a supply pressure of 5 bar and conduits (1 mm²) un spaces of 3 m with 50.1 l/h oxime and 23.8 l/h oleum in the presence of 300 Nm³/h of nitrogen in a circuit having a recirculation volume of 1125 l/h, 50.1 l/h of lactam are produced. The reaction temperature did not exceed 100° C. by virtue of the measured, finely dispersed addition of the oleum. The cooling water temperature in the tempering jacket was 30° C.

EXAMPLE 3

100 l/h of highly viscous siliconol and 120 Nm³/h of nitrogen are passed through a two-phase flow tube (length 12 m, $\phi$ 25 mm, tube diameter/coil diameter 0.1). Just upstream of the evaporator exit, 70% of the gas was run off through a side conduit (40 mm²). In this way, the end of the tube could be positioned in the actual intake of the discharge member, thereby eliminating the problem of product caking on the walls of the separation vessel situated between the tube and the discharge member without any danger of the intake being washed free.

What is claimed is:

1. An apparatus for mixing, reacting and/or evaporating components in a multi-phase flow tube, comprising a helically wound tube having an entrance end and an exit end, having a feed pipe in the entrance end of the tube and a separation vessel at the exit end of the tube, the helically wound tube being surrounded by a tempering jacket divided into sections, and one or more conduits, said conduits opening in the tube and projecting through the tempering jacket, through the tube wall and beyond the internal surface of the tube wall, arranged along the axis of the helically wound tube.

2. The apparatus of claim 1, wherein the feed pipe is in the form of a two-component nozzle.

3. The apparatus of claim 1, wherein the openings of the conduits in the helically wound tube are not in the form of nozzles.

* * * * *